July 14, 1953     H. J. EASTMAN ET AL     2,645,027
WELL CALIPER
Filed June 9, 1947
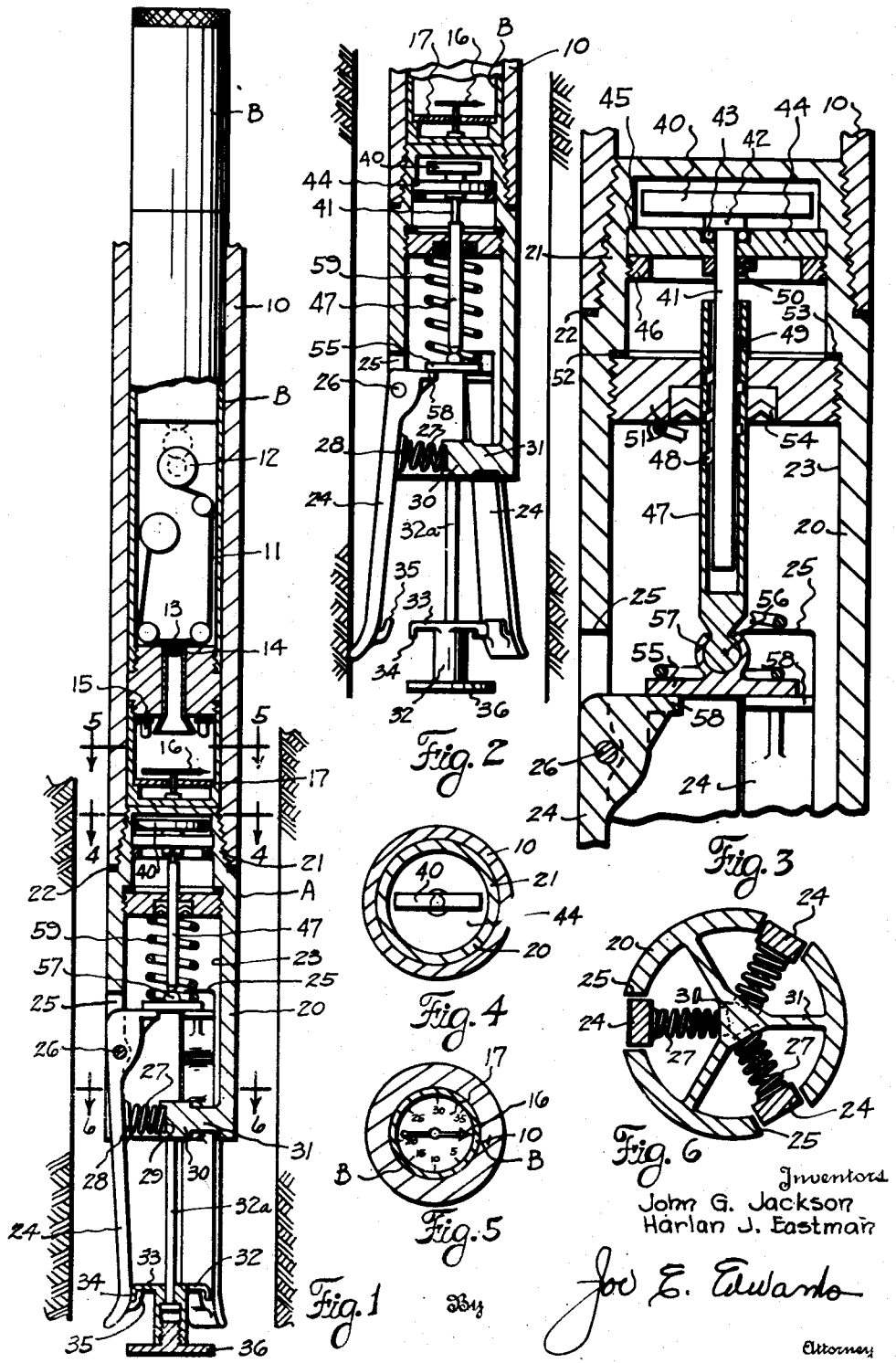
Inventors
John G. Jackson
Harlan J. Eastman
Joe E. Edwards
Attorney Patented July 14, 1953

2,645,027

UNITED STATES PATENT OFFICE 2,645,027

WELL CALIPER

Harlan J. Eastman and John G. Jackson, Denver, Colo., assignors to Eastman Oil Well Survey Company, Denver, Colo., a corporation of Delaware Application June 9, 1947, Serial No. 753,512

9 Claims. (Cl. 33—178)

This invention relates to new and useful improvements in well calipers.

One object of the invention is to provide an improved well caliper device which is adapted to traverse a well bore and which has means for measuring and recording variations in the diameter of said well bore.

An important object of the invention is to provide an improved well caliper of the mechanical type having measuring arms which engage the wall of the well bore to measure variations in the diameter of said bore, said caliper being constructed so that it may be combined with an ordinary photographic well survey instrument, whereby the measurements made and indicated by the caliper may be photographically recorded by the well survey instrument.

Still another object of the invention is to provide an improved caliper device which is adapted to be combined with a "multiple shot" type of well survey instrument to obtain a plurality of records at timed intervals as the device traverses the well bore or which may be connected with a "single shot" well survey instrument to provide only a single record at a desired elevation in the bore in those instances where only the one measurement is required.

A particular object of the invention is to provide an improved well caliper device having pivotally mounted measuring arms which engage the wall of the bore to measure its diameter, together with an improved means for transmitting the movement of said arms, as controlled by the well bore diameter, to an indicator within a well survey instrument, whereby a photographic record of the indicator may be made by said instrument.

A still further object of the invention is to provide a caliper device, of the character described, wherein the usual magnetic compass needle of the well survey instrument is employed as the caliper indicator and also wherein an improved magnetic coupling arrangement which is controlled by the movable caliper arms of the device transmits the movement of the arms to the compass needle or indicator to provide an accurate indication of the position of said arms and thereby indicate the well bore diameter.

A further object of the invention is to provide an improved caliper device, of the character described, wherein the caliper arms and their associated mechanism is a unitary structure entirely separate from the well survey instrument which actually effects the recording, whereby the caliper device can be readily connected thereto and the problem of sealing the instrument against well pressure and fluid is substantially eliminated.

The construction designed to carry out the invention will be hereinafter described together with other features of the invention.

The invention will be more readily understood from a reading of the following specification and by reference to the accompanying drawing, wherein an example of the invention is shown, and wherein:

Figure 1 is a view, partly in section and partly in elevation, of a well caliper device constructed in accordance with the invention, combined with a "multiple shot" type of well survey instrument and showing the measuring arms retracted, Figure 2 is a similar view with the measuring arms extended, Figure 3 is an enlarged detail of the rotatable magnetic coupler and its operating sleeve, Figure 4 is a horizontal, cross-sectional view taken on the line 4—4 of Figure 1, Figure 5 is a horizontal, cross-sectional view taken on the line 5—5 of Figure 1, and Figure 6 is an enlarged, horizontal, cross-sectional view taken on the line 6—6 of Figure 1.

In the drawings, the letter A designates a well caliper unit which is adapted to be connected to the lower end of an outer protective casing or barrel 10 of a well survey instrument B. In Figures 1 and 2 the well survey instrument is shown as the usual photographic type of "multiple shot" instrument. The instrument is self contained, being powered by dry cell batteries and a suitable mechanism is provided for driving a film 11 which is wound around supporting spools 12 within said instrument. The film moves over an opening 13 which has a suitable lens 14 therein. Electrical lamps 15 are operated intermittently to expose the film 11 so as to photograph a magnetic indicator or needle 16 which is located in the lower portion of the instrument. Beneath the needle is a dial 17 which is suitably calibrated in inches and obviously the position of the needle with respect to the dial will be photographed. In accordance with the operation of this type of well survey instrument, photographs are taken intermittently as the instrument is lowered in the well and a record is kept of the elevation at which each photograph is made.

The instrument B may be a standard multiple shot well survey instrument with the exception that the dial 17 is normally a compass card and the needle 16 is a compass needle for indicating compass direction. Although it is usual practice to locate a plumb bob within the compass chamber above the needle 16, such plumb bob is preferably eliminated when using the survey instrument in the present invention. Thus, it will be seen that the instrument B is of standard construction with the exception that the dial 17 replaces the usual compass dial and the indicator 16 may be either a compass needle or an ordinary metallic pointer.

When lowering the well survey instrument B within a well bore it is usual practice to house said instrument within the outer barrel 10 which functions as a protective casing to prevent damage to said instrument. The well caliper unit A is connected to the lower end of the instrument barrel 10 and is arranged, as will be explained, to measure and indicate the diameter of a well bore as the unit is lowered therethrough. The caliper unit is coupled to the metallic needle or indicator 16 in a manner to control the position of this indicator with reference to the dial 17 in accordance with the particular diameter of the hole. Thus, the caliper unit A controls the position of the needle or indicator 16 to properly position the indicator with respect to its dial 17 to thereby indicate the well diameter. The indications of the indicator 16 are intermittently recorded at predetermined elevations within the well bore on the photographic film 11. Therefore, the assembly may be lowered into a well bore and as it traverses said bore, the needle or indicator 16 is moved into indicating positions in accordance with the well bore diameter and the instrument B operates to photographically record such indications.

The well caliper unit A includes a tubular body or support 20 which is formed with an upstanding, externally screw threaded connecting pin 21 which threads into the lower end of the instrument barrel 10. A suitable annular packing ring 22 may be disposed adjacent the threaded joint to prevent the admission of fluid into the barrel. The body 20 and its pin 21 is formed with an axial bore 23 which extends substantially entirely therethrough, said bore terminating just short of the top of the connecting pin 21. A plurality of measuring elements or arms 24 are mounted at spaced points around the lower portion of the body 20, each arm having its upper end disposed and movable within a vertical slot 25 and being pivoted on a suitable pivot pin 26 extending across said slot. Any desired number of measuring arms may be employed although three are shown as spaced at equi-distant points around the body. The lower end of each arm is adapted to engage the wall of the well bore as the device is raised therethrough and the particular outward disposition of the arms will, of course, be in accordance with the particular diameter of the well bore.

The measuring elements or arms 24 are normally urged toward an outward or expanded position by coil springs 27, each spring being confined within a recessed boss 28 formed on the inner surface of each arm and a recess 29 provided in a central block 30 which is located within the body 20 and which is supported therein by integral webbed portions 31. The springs 27 normally urge the measuring elements or arms toward an outward position whereby their lower ends are engaged with the well bore.

It is the usual practice to caliper the well upon the raising or lifting of the assembly through the well bore and in order to maintain the measuring elements or arms in their retracted or inactive position during lowering of the assembly, a latch member 32 is provided. The latch is slidably supported on a guide rod 32a which has its upper end suitably secured to the central block 30. This latch has radial arms 33 formed with depending lugs 34, each lug being adapted to engage a keeper 35 on the rear surface of each measuring element 24. The latch member 32 has a flat plate-like foot piece 36 which extends below the lower ends of the measuring elements or arms 24 when the latches are engaged with said keepers. It will be apparent that with the latch in position as shown in Figure 1, the measuring elements or arms 24 are locked against outward movement. This permits the assembly to be lowered through the well bore without danger of said arms hanging or otherwise becoming engaged with projections on the wall of the bore. When the assembly reaches bottom, the foot piece 36 of the latch strikes the bottom first and continued lowering the assembly permits disengagement of the latch lugs 34 with the recesses of the actuating arms. The arms are thus released for expansion and due to the pivotal mounting of said arms, the lower ends thereof are moved outwardly into engagement with the wall of the well bore, such outer movement being effected by the coil springs 27.

After the arms 24 are engaged with the well bore, the assembly is raised or lifted to the surface and it will be obvious that the position of said arms will be controlled by the diameter of the well bore since said arms ride upon the wall thereof. As the well bore diameter reduces, the lower ends of the arms will naturally move inwardly and as the well bore diameter increases the arms will move outwardly a further distance. Therefore, the angular position of the measuring arms 24 is controlled solely by the well bore diameter.

For transmitting the movement of the measuring arms 24, as they are actuated in accordance with the variations in the diameter of the well bore, to the metallic or magnetic indicating needle 16 to locate this needle in proper indicating position with respect to the dial 17, a magnetic coupling arrangement is disposed within the upper portion of the bore 23 of the body 20. As is clearly shown in Figure 3 this arrangement includes a magnetic bar 40 which is secured to the upper end of a rotatable shaft 41. A bearing collar 42 formed at the upper end of the shaft and immediately below the magnetic bar 40 is journaled upon ball bearings 43 which are mounted within a bearing plate 44. The plate 44 is supported within the upper end of the bore 23 with its upper peripheral edge abutting an annular shoulder or seat 45 and being retained therein by a retaining ring 46 threaded into the bore. The rotatable shaft 41 extends downwardly through the bearing plate 44 and axially within an actuating sleeve 47. The actuating sleeve is formed with an internal helical or spiral groove 48 while the rotatable shaft has a radially extending pin 49 engaging within said groove. When the actuating sleeve 47 is reciprocated vertically, the co-action between the helical groove 48 and connecting pin 49 of the rotatable shaft will impart a rotation to said shaft. Longitudinal movement of the shaft is prevented by a retaining collar 50 which is secured to the shaft and which abuts the underside of the bearing plate 44.

The actuating sleeve 47 is controlled in its longitudinal or vertical reciprocation by the pivoted measuring elements or arms 24 of the caliper unit A. As is clearly shown in Figures 2 and 3, the actuating sleeve is slidable through a bearing block 51 which is threaded into the bore 23 of the body 20. A suitable packing gasket 52 may be interposed between the upper end of the block 51 and an internal shoulder 53 formed in the bore to prevent the admission of pressure or fluid into the upper portion of the bore of said body. Pressure seal packing rings 54 disposed within the lower end of the block 51 surround the actuating sleeve 47 to pack off therearound.

The extreme lower end of the actuating sleeve 47 has a ball joint connection with a foot plate 55, the ball 56 of said connection being made integral with the actuating sleeve and the ball socket 57 thereof being formed integral with the foot plate. The foot plate normally rests upon and is supported on inwardly extending lugs 58 which lugs are formed at the upper ends of the measuring elements or arms 24. A coil spring 59 surrounds the lower portion of the actuating sleeve 47 and is confined between the foot plate 55 and the underside of the bearing block 51 and constantly exerts its pressure to urge the foot plate into engagement with the inwardly extending lugs 58 of the actuating elements.

Since the foot plate 55 is supported upon the upper ends of the measuring elements or arms 24, swinging of the elements will result in a lowering and raising of the foot plate 55. It may occur that the unit is not exactly centered within the well bore with the result that all of the measuring arms will not swing the same distance; that is, one of the arms may move outwardly a greater distance than the other. It is therefore desirable to measure the average movement of the three arms and the ball and socket connection between the foot plate and actuating sleeve accomplishes this purpose since it permits tilting of the foot plate 55 and assures said plate remaining in contact with all of the measuring arms at all times. Thus, even though one measuring arm swings outwardly a greater distance than the others which lowers its supporting lug 58 more than the lugs of the other arms, the ball and socket connection functions as an integrator unit so that the movement of the actuating sleeve is more or less in accordance with the average of the movement of all three measuring arms, whereby even though the unit is not exactly centered in the well bore a relatively accurate indication of well diameter will be produced. As the measuring arms swing outwardly due to an increased diameter of the bore, the lugs 58 at their upper ends move downwardly which allows the foot piece and actuating sleeve 47 to also move downwardly. This downward movement of the actuating sleeve will impart a rotation to the magnetic bar 40, such rotation being in direct ratio to the amount of travel of the sleeve 47. Since the magnetic bar 40 is located at the upper end of the bore 23 which extends through the body 20 and pin 21, it is in relatively close proximity to the magnetic needle 16 within the lower end of the survey instrument B. As the magnetic bar is rotated, it imparts a similar rotation to the magnetic needle 16 and thus the indication given by said needle or indicator 16 is controlled by the amount of pivotal movement of the measuring arms. It is, of course, evident that the body 20 as well as the instrument barrel 10 and housing of the well survey instrument B as well as all other parts adjacent to the metallic needle 16 and magnetic bar 40 are constructed of a non-magnetic material so as not to influence the needle 16 and to assure that the position of said needle is controlled by the position of the bar 40.

In the operation of the mechanism, the well caliper unit A is connected to the lower end of the instrument casing after the survey instrument B has been properly located therein. The latch 32 is engaged with the keepers 35 of the measuring elements or arms 24 and locks these elements in their inward or retracted position as shown in Figure 1. At this time, the upper surface of each lug 58 of each actuating element is in a substantially horizontal plane and in such position the actuating sleeve 47 is in its raised position. At this time the magnetic bar 40 is in such position that the needle or indicator 16 of the survey instrument is disposed adjacent the zero indication or at any indication representative of the diameter of the unit A.

The entire assembly is lowered into the well bore and since the measuring arms are locked in a retracted position lowering through the well bore is facilitated. The timing mechanism of the well survey instrument is set so that said instrument does not begin operation until sufficient time has elapsed to lower the device to the bottom of the well bore. Upon reaching bottom, the foot piece 36 of the latch 32 strikes the bottom and is disengaged from the keepers of the measuring elements or arms 24, whereby said arms are immediately moved to an outer position by the coil springs 27. Outward movement of the lower ends of the arms will, of course, be halted by the engagement of the arms with the wall of the well bore.

As the arms swing outwardly, the lugs 58 at the upper ends thereof move downwardly in accordance with the amount of outward movement of the actuating arms. Such downward movement allows a lowering of the actuating sleeve 47, whereby a rotation is imparted to the shaft 41 through the spiral or helical groove 48 and engaging pin 49. Rotation of the shaft rotates the magnetic bar 40 and results in a rotation of the indicating needle or indicator 16 within the survey instrument B. At this time the timing mechanism of the survey instrument operates said instrument so that a photograph of the indicator 16 and the dial 17 is taken. The dial is suitably calibrated in inches so that the indication photographed shows the exact diameter of the well bore as it is measured by the arms 24. After the photograph is taken, the timing mechanism of the instrument extinguishes the lamps 15 and then at progressive intervals relights said lamps and intermittently operates the film 11 to obtain additional photographs at predetermined intervals.

Since the operator knows the timing of the operation of the survey instrument B, the caliper is moved upwardly in the well and during such upward movement the arms 24, riding upon the wall of the well bore control the position of the indicator 16. Each time that a photograph is taken the assembly is permitted to remain at rest and thus when the assembly finally reaches the surface, the film 11 has a plurality of recordings or photographs thereon each of which was taken at a predetermined elevation within the well bore. Through the use of such photographs, the diameter of the well bore throughout its entire length may be plotted.

The device is relatively simple in operation and is exceptionally accurate since it utilizes the mechanical measuring arms for determining the diameter of the bore. The movement of the arms as they are controlled by the varying diameters in turn control the position of the indicating needle 16, this control being accomplished through the magnetic coupling by the said needle and the magnetic bar 40. The instrument, as well as the magnetic coupling arrangement is suitably packed off from the well bore pressures and fluids so that no damage to these parts can occur. The pivoted arms which are relatively heavy, together with the lower portion of the actuating sleeve may be exposed to these pressures and fluids without interfering with their operation.

An important feature of the invention is the combination of a mechanical caliper unit with an ordinary survey instrument, whereby the caliper indications may be photographically recorded. As has been explained the working mechanism of a usual multiple shot survey instrument need not be changed in order to permit it to record the caliper units measurements. So far as the well survey instrument is concerned it would be possible to employ a usual instrument having a compass and a plumb bob, with the compass being controlled by the magnetic bar to provide an indication. However, as shown in the drawing the usual compass and plumb bob unit is preferably replaced by the unit housing, the metallic indicating needle 16 and a properly calibrated dial 17.

In the drawings, the caliper unit has been shown as combined with a modified type of multiple shot well survey instrument, whereby a plurality of photographs at predetermined intervals may be obtained. However, the invention is not to be limited to the combination with this particular type of instrument since it may be combined with any of the well known types of well survey instruments having magnetic compasses therein. For example, the caliper unit A may be combined with an ordinary "single shot" type of instrument. This instrument ordinarily includes a magnetic compass and a plumb bob which are photographed in a single disk so that only a single picture is obtained. In such arrangement, the caliper unit is mounted below the "single shot" instrument in exactly the same manner as it is shown connected to the multiple shot instrument and has its magnetic bar 40 controlling the position of the instrument's compass needle in accordance with the position of the measuring elements or arms 24.

The operation when the unit is combined with a single shot instrument is identical to that of the form shown in Figures 1 and 2. The only difference in operation would be that the single shot instrument will take only a single picture whereas in the combination illustrated and previously described a plurality of photographs are taken at predetermined intervals. It is, of course, evident that the caliper unit may be readily combined with any standard type of single shot instrument.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. The combination with a well survey instrument having a magnetic indicator therein and also having therein means for photographically recording the indication of said indicator, of a well caliper unit attached to the survey instrument for combined placing in a well bore and including, a support adapted to be connected in position below the instrument, a plurality of movable measuring elements mounted on the support and adapted to yieldingly engage the wall of the well bore whereby said elements assume positions in accordance with the well bore diameter, a movable magnetic member within the upper end of the support and in sufficiently close proximity to the indicator within the instrument to effect movement thereof through its magnetic influence, and means for imparting movement to the magnetic member in accordance with the movement of the measuring elements, whereby said member and the indicator actuated thereby assume positions representative of the well bore diameter as measured by the measuring elements.

2. The combination with a well survey instrument having a magnetic indicator therein and also having therein means for photographically recording the indication of said indicator, of a well caliper unit attached to the survey instrument for combined placing in a well bore and including, a support adapted to be connected in position below the instrument, a plurality of movable measuring elements mounted on the support and adapted to yieldingly engage the wall of the well bore whereby said elements assume positions in accordance with the well bore diameter, a movable magnetic member within the upper end of the support and in sufficiently close proximity to the indicator within the instrument to effect movement thereof through its magnetic influence, a reciprocable actuating means coacting with the measuring elements and reciprocated in accordance with the movement of the measuring elements as the well bore diameter varies, and means for operatively connecting the reciprocable actuating means to the magnetic member whereby reciprocation of the actuation means imparts movement to said member and said member as well as the indicator of the instrument controlled by the magnetic influence of said member assume positions representative of the well bore diameter as measured by the measuring elements.

3. The combination with a well survey instrument having a magnetic indicator therein and also having therein means for photographically recording the indication of said indicator, of a well caliper unit attached to the survey instrument for combined placing in a well bore and including, a support adapted to be connected in position below the instrument, a plurality of movable measuring elements mounted on the support and adapted to yieldingly engage the wall of the well bore whereby said elements assume positions in accordance with the well bore diameter, a magnetic bar mounted on a rotatable shaft in the upper portion of the support and located in sufficiently close proximity to the indicator within the instrument to effect movement thereof through its magnetic influence, a reciprocable actuating sleeve surrounding the shaft and having an operative connection therewith whereby reciprocation of the sleeve imparts rotation to the shaft and magnetic bar and through the magnetic influence of the bar to the indicator, and means for controlling the reciprocation of the actuating sleeve by the movement of the measuring elements whereby the reciprocation of the sleeve and rotation of the magnetic bar are in direct ratio to the movement of the measuring elements as they measure the well bore diameter.

4. The combination with a well survey instrument having a magnetic indicator therein and also having therein means for photographically recording the indication of said indicator, of a well caliper unit attached to the survey instrument for combined placing in a well bore and including, a support adapted to be connected in position below the instrument, a plurality of movable measuring elements mounted on the support and adapted to yieldingly engage the wall of the well bore whereby said elements assume positions in accordance with the well bore diameter, a magnetic bar mounted on a rotatable shaft in the upper portion of the support and located in sufficiently close proximity to the indicator within the instrument to effect movement thereof through its magnetic influence, a reciprocable actuating sleeve surrounding the shaft and having an operative connection therewith whereby reciprocation of the sleeve imparts rotation to the shaft and magnetic bar and through the magnetic influence of the bar to the indicator, the lower end of said reciprocable sleeve having means engaging the upper ends of the measuring elements whereby as said elements are moved due to passing through a well bore of varying diameters, the sleeve is reciprocated to rotate the magnetic bar and indicator in direct ratio to the movement of the measuring elements with the result that said indicator indicates the diameter of the well bore as measured by said measuring elements.

5. A unitary well caliper device for measuring and recording the diameter of a well bore by insertion therein and including, a support, a plurality of measuring elements pivotally mounted on the support and having their lower ends adapted to yieldingly engage the wall of the well bore whereby said elements are swung to positions relative to the body in accordance with the well bore diameter, a casing secured to the upper end of the support, a metallic indicator within said casing susceptible to magnetic influence, means also within the casing for photographically recording the position of said indicator, a rotatable magnetic bar within the upper end of the support and in sufficiently close proximity to the indicator to effect movement thereof through its magnetic influence, and means operatively connecting said magnetic bar with the measuring elements whereby the position of said elements as controlled by the well bore diameter controls the position of the bar and also through said bar the position of the indicator with the result that the indicator indicates the diameter of said well bore.

6. A well caliper device as set forth in claim 5, wherein the means for photographically recording the position of the indicator is time-controlled, whereby the said means is successively actuated at predetermined spaced intervals to record the diameter of the well bore throughout its length as the device traverses said bore.

7. A unitary well caliper device for measuring and recording the diameter of a well bore by insertion therein and including, a support, a plurality of measuring elements pivotally mounted on the support and having their lower ends adapted to yieldingly engage the wall of the well bore whereby said elements are swung to positions relative to the body in accordance with the well bore diameter, a casing secured to the upper end of the support, a metallic indicator within said casing susceptible to magnetic influence, means also within the casing for photographically recording the position of said indicator, a rotatable magnetic bar within the upper end of the support and in sufficiently close proximity to the indicator to effect movement thereof through its magnetic influence, and a reciprocable actuating sleeve within the support operatively connected with the rotatable bar for imparting rotation to the bar when said sleeve is reciprocated, said sleeve having means at its lower end engaging the upper end of the pivoted measuring elements whereby the movement of said elements as controlled by the well bore diameter controls the reciprocation of the sleeve and thereby controls rotation of the magnetic bar and position of the indicator.

8. A unitary well caliper device for measuring and recording the diameter of a well bore by insertion therein and comprising a tubular support for movement in the well bore, movable means mounted on the support and adapted to engage the wall of the bore, means for biasing the movable means into engagement with the wall of the bore so that as the support is moved in the bore the said means will move and follow the irregularities of the wall, a tubular member having a sealed compartment above the first tubular support, indicating means comprising a pivoted indicator and indicia associated therewith mounted in the sealed compartment with the indicator having a vertical axis of rotation, means for causing the indicator to be rotated to different positions in response to movement of the movable means to different positions as the support is moved and thereby indicate the diameter of the well bore, said last named means including a rotatable member mounted for rotation on a vertical axis in the tubular support below the sealed compartment and means for rotating the rotatable member by the movable means engaging the bore, and means in the tubular member above the indicator and indicia for photographically recording the indicator and the indicia indicated.

9. An earth bore caliper unit for substitute attachment to the lower end of a survey instrument barrel containing means for photographically recording the positions of a magnetic indicator and from which has been detached a unit for causing the indicator to indicate direction, said substitute caliper unit comprising a support barrel for attachment to the lower end of the instrument barrel and arranged to provide a seal between the barrels, a plurality of movable measuring elements mounted on the barrel, means for yieldably biasing the elements into engagement with the wall of the bore as the unit and instrument barrels are moved in said bore, and means for coupling the measuring elements to move the magnetic indicator in accordance with the change in bore diameter, said last named means including a magnetic bar of the permanent magnet type mounted for rotation at the upper end of the caliper unit barrel so as to be in a plane below the plane of the indicator when the barrels are connected together, and means for rotating the magnetic bar by the movable measuring elements.

HARLAN J. EASTMAN.
JOHN G. JACKSON.

(References on following page)

References Cited in the file of this patent

UNITED STATES PATENTS

| Number | Name | Date |
|---|---|---|
| 595,865 | Reisner | Dec. 21, 1897 |
| 713,784 | Mellor | Nov. 18, 1902 |
| 1,329,456 | Carpenter | Feb. 3, 1920 |
| 1,925,223 | Ahlburg | Sept. 5, 1933 |
| 1,959,141 | Sperry | May 15, 1934 |
| 2,102,080 | Kinley | Dec. 14, 1937 |
| 2,123,355 | Feehrer | July 12, 1938 |
| 2,187,367 | Smith | Jan. 16, 1940 |
| 2,235,533 | Roberts | Mar. 18, 1941 |
| 2,249,477 | Kuehni | July 15, 1941 |
| 2,281,960 | Vacquier | May 5, 1942 |
| 2,311,387 | Hastings | Feb. 16, 1943 |
| 2,371,511 | Faus | Mar. 13, 1945 |
| 2,382,609 | Dale | Aug. 14, 1945 |
| 2,392,357 | Bays | Jan. 8, 1946 |
| 2,398,562 | Russell | Apr. 16, 1946 |
| 2,427,950 | Doll | Sept. 23, 1947 |
| 2,429,620 | Harrington | Oct. 28, 1947 |
| 2,449,283 | Dike et al. | Sept. 14, 1948 |
| 2,512,986 | Woodcock et al. | June 27, 1950 |

OTHER REFERENCES

H. H. Haddock: "Deep Borehole Surveys and Problems," McGraw-Hill Book Co., Inc. New York, 1931, pages 30, 31.